United States Patent
Kamm

(10) Patent No.: US 11,836,789 B1
(45) Date of Patent: *Dec. 5, 2023

(54) VIRTUAL SALESPERSON SYSTEM AND METHOD

(71) Applicant: VERSATA DEVELOPMENT GROUP, INC., Austin, TX (US)

(72) Inventor: John W. Kamm, Austin, TX (US)

(73) Assignee: Versata Development Group, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/896,410

(22) Filed: Aug. 26, 2022

Related U.S. Application Data

(63) Continuation of application No. 16/952,337, filed on Nov. 19, 2020, now Pat. No. 11,461,838, which is a continuation of application No. 16/198,584, filed on Nov. 21, 2018, now Pat. No. 10,872,373, which is a continuation of application No. 13/487,523, filed on Jun. 4, 2012, now Pat. No. 10,176,518.

(60) Provisional application No. 61/493,907, filed on Jun. 6, 2011.

(51) Int. Cl.
G06Q 30/0601 (2023.01)
G06Q 30/02 (2023.01)

(52) U.S. Cl.
CPC ..... *G06Q 30/0643* (2013.01); *G06Q 30/0281* (2013.01)

(58) Field of Classification Search
CPC ............. G06Q 30/0643; G06Q 30/0281
See application file for complete search history.

(56) References Cited

U.S. PATENT DOCUMENTS

| 6,041,310 A * | 3/2000 | Green ................. G06Q 30/02 705/26.61 |
| 6,925,196 B2 * | 8/2005 | Kass .................. G06Q 30/06 345/593 |
| 9,760,896 B2 * | 9/2017 | Ghosh ............. G06Q 30/0205 |
| 2005/0177463 A1 * | 8/2005 | Crutchfield .......... G06Q 30/06 705/27.2 |
| 2005/0209868 A1 * | 9/2005 | Wan ................ G06Q 10/0639 705/345 |
| 2007/0090185 A1 * | 4/2007 | Lewkowitz .......... G07F 7/02 235/462.46 |

(Continued)

OTHER PUBLICATIONS

Delta Faucet Company Opens Flagship Showroom in Chicago's Merchandise Mart: DREAM2O Showroom Features Interactive Tools for Architects, Designers, and Homeowners. Anonymous. PR Newswire New York: PR Newswire Association LLC. (May 11, 2011) (Year: 2011).*

(Continued)

*Primary Examiner* — Michael Misiaszek

(57) ABSTRACT

A virtual salesperson system and method for tablet computers such as Apple's iPad can be used by the customer (as opposed to most applications which are for the dealer, or on a central kiosk) to provide the customer a tour of a showroom and each vehicle, highlighting key features and other content at the discretion of the OEM, such as videos tours conducted by their spokesperson. In at least one embodiment, the customer can also search inventory, potentially at this dealer and other 'friendly' dealerships with whom this dealer has a trading relationship. Other sales tools such as build and price, payment estimation, etc are available as well.

12 Claims, 11 Drawing Sheets

(56) References Cited

U.S. PATENT DOCUMENTS

| | | | | |
|---|---|---|---|---|
| 2008/0065601 A1* | 3/2008 | Korbonski | ............... | G06F 16/20 |
| 2008/0294512 A1* | 11/2008 | Gussoni | ................. | G06Q 30/02 |
| | | | | 705/14.39 |
| 2011/0276385 A1* | 11/2011 | Keller | .................. | G06Q 20/202 |
| | | | | 705/346 |
| 2012/0095882 A1* | 4/2012 | Wolff | ................. | G06Q 30/0238 |
| | | | | 705/27.2 |
| 2012/0246027 A1* | 9/2012 | Martin | ............... | G02B 27/0172 |
| | | | | 705/26.63 |
| 2012/0296777 A1* | 11/2012 | Fugman | ............. | G06Q 30/0281 |
| | | | | 709/217 |

OTHER PUBLICATIONS

Notice of Allowance dated May 25, 2022 in U.S. Appl. No. 16/952,337, p. 1.
Terminal Disclaimer filed Apr. 22, 2022 in U.S. Appl. No. 16/952,337, p. 1.
Terminal Disclaimer approved Apr. 22, 2022 in U.S. Appl. No. 16/952,337, p. 1-2.
Response to Non-Final Office Action dated Apr. 22, 2022 in U.S. Appl. No. 16/952,337, pp. 1-8.
Non-Final Office Action dated Dec. 22, 2021 in U.S. Appl. No. 16/952,337, pp. 1-8.

\* cited by examiner

VIRTUAL SALESPERSON SYSTEM AND METHOD

CROSS-REFERENCE TO RELATED APPLICATION

This application claims the benefit under 35 U.S.C. § 119(e) and 37 C.F.R. § 1.78 of U.S. Provisional Application No. 61/493,907, filed Jun. 6, 2011, and entitled "Virtual Salesperson System and Method", which is incorporated by reference in its entirety.

BACKGROUND OF THE INVENTION

Field of the Invention

The present invention relates in general to the field of information processing, and more specifically to a system and method for providing a virtual salesperson.

Description of the Related Art

Products are often sold via the interaction between a customer and a salesperson using various technologies. For example, automobile dealerships have sales applications installed on desktop computers at salespeople's desks, or available as a public kiosk, perhaps combined with a mobile website. When a consumer visits the dealership, they may walk the dealership's lot with a brochure, or they have to engage with a salesperson to find out more about the vehicles.

From an original equipment manufacturer (OEM) perspective, the dealership salespeople may not be fully trained to highlight all the key features and differentiators of the vehicles effectively. From a dealership perspective, a dealer must maintain appropriate staff to handle peak loads like weekday evenings or weekends which is expensive. From a salesperson perspective, customers may not be knowledgeable about the vehicle and require a lot of time to close a sale. From a customer perspective, they have to interact with a potentially distrusted salesperson whose interests aren't necessarily aligned with the customers, especially if they want a vehicle that isn't on the dealer's lot.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
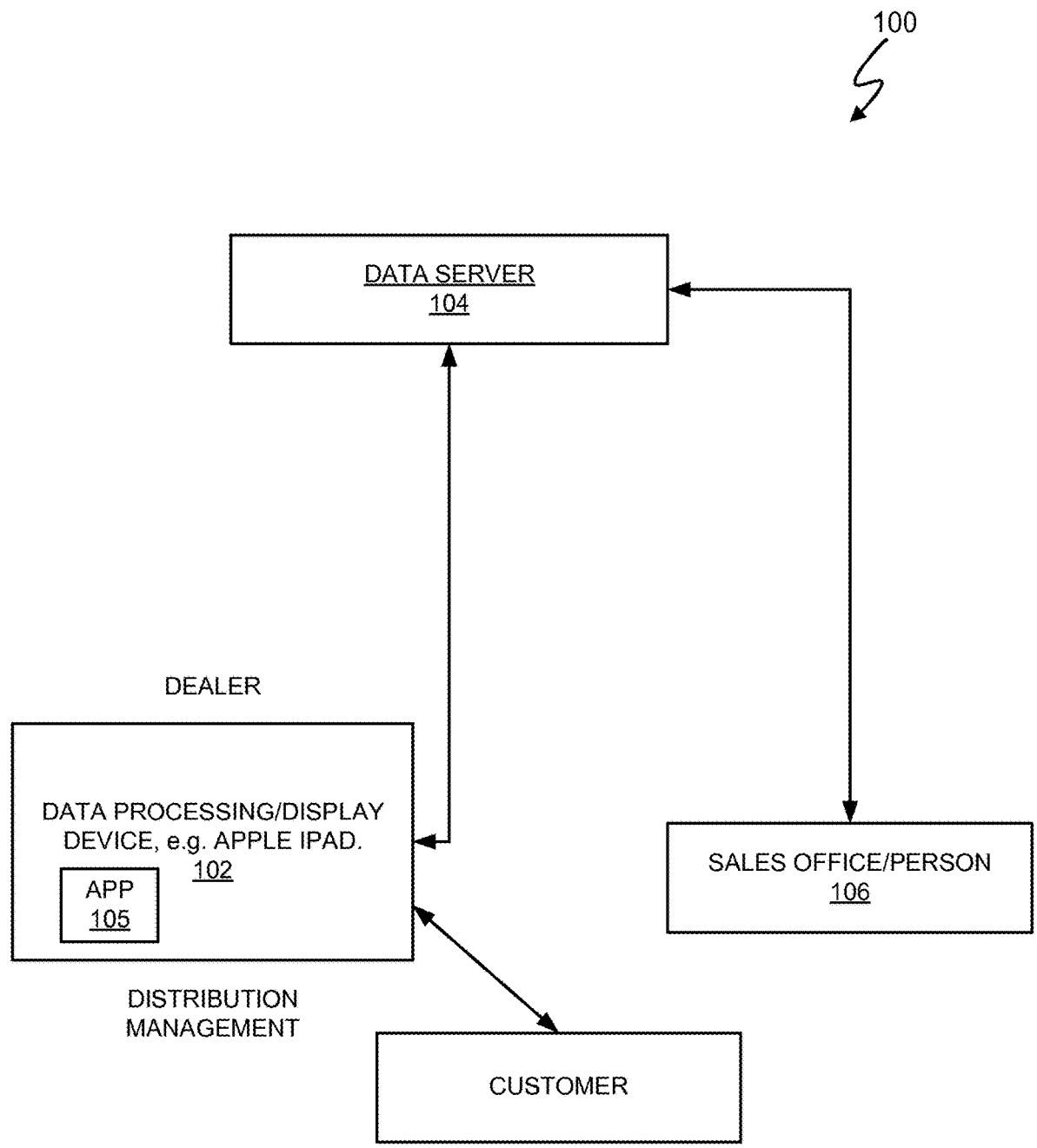
FIG. 1 depicts an exemplary system diagram of a virtual salesperson system.

In an embodiment of the virtual salesperson system and method, an application (as described in the attached PowerPoint presentation) has been developed for tablet computers such as Apple's iPad which can be used by the customer (as opposed to most applications which are for the dealer, or on a central kiosk) to provide the customer a tour of the showroom and each vehicle, highlighting key features and other content at the discretion of the OEM, such as videos tours conducted by their spokesperson. In at least one embodiment, the customer can also search inventory, potentially at this dealer and other 'friendly' dealerships with whom this dealer has a trading relationship. Other sales tools such as build and price, payment estimation, etc are available as well.

In at least one embodiment, while the customer is interacting with the application at their own leisure, the application is tracking which videos the user viewed, which vehicles the customer is interested in, the payment estimation inputs such as trade-in or monthly payment, and providing that back to the dealership sales manager so he can craft an initial offer that better aligns with the customer's expectations.

Plus, in at least one embodiment, dealers will be able to subscribe to some of the additional dealer-specific functionality on a monthly basis—in a "freemium" model. The OEM can produce the application, and dealers can choose to 'subscribe' to functionality that is only enabled based on the GPS Location (only available at the physical dealership). Thus, the application can be freely distributed by the OEM, but an additional revenue source for the application is the dealers funding the dealer-specific functionality.

Exemplary Points:
Engagement/Business Model: Giving the customer a 'loaner' iPad by a receptionist upon arrival at the dealership and letting the customer
Application that tracks user behavior and reports back to Sales Manager to
Use of network or GPS Location to 'unlock' functionality that is only available at the dealership.
Use of tablet and GPS location to inform the salesperson that the customer is ready and would like a salesperson to come out to the lot to discuss a vehicle.

Helping the dealer do a better job meeting and selling to a customer rather than being a substitute salesperson.

Videos exist to show features of a product and help them understand a product. To make these work, you either have to walk back into the showroom, or the salesperson is trying to explain advanced features, which is difficult. This technology tells you about a specific product, such as features available on a specific car. App can also provide pricing, financing, etc. The app can also describe alternatives to the current product.

In at least one embodiment, the virtual salesperson system and method provides new engagement for customers at the point of sale on a showroom that is more economical for dealers and more aligned with customer and OEM goals—whereas they have been competing interests. Dealers motivations: selling a car on their lot. Dealer trades with other dealers or ordering is less desirable than inventory sales. OEM: Selling any car, anywhere. Want the customer to be with happy with the car they buy. anywhere. Customer: what is the right car for me, and what is the best deal I can get.

In at least one embodiment, virtual salesperson system and method helps guide the customers and bring them further along in the process. Now the sales person is dealing with a knowledgeable person, can minimize time, and can make the sale. Dealers: sales team staffed with a few in the day, all evenings, and weekends. Must staff a lot of people to meet customer demands. This virtual salesperson system and method can make sales staffing more efficient. Salesperson can focus more on the sales as opposed to explaining features and finding out what other options the customer can get.

FIG. 1 depicts an exemplary embodiment of a virtual salesperson environment 100. A product dealer has one or more data processing display devices 102, such as Apple iPads™. In at least one embodiment, some devices 102 are managed and distributed to potential customers by, for example, a receptionist or salesperson at the product dealer's facility. Other devices 102 may be owned by the customers. In at least one embodiment, certain functionality of the device 102 is unlocked (enabled) when the device 102 is on or in close proximity to the dealer's facility. In at least one embodiment, an original equipment manufacturer (OEM) or other entity can provide basic functionality and allow dealers to subscribe to additional functionality that can be unlocked only at the subscriber dealer. In at least one embodiment, the device 102 utilizes the device's location and unlocks (enables) virtual sales person functionality and/or unlocks the functionality when on the dealer's network. So, some or all of the features of the virtual salesperson device 102 are available only within a certain location, which, in at least one embodiment, is on or in close proximity to the dealer's facility.

Exemplary unlocked functionality is (i) searching dealer inventory, (ii) searching for a trade at another dealership, (iii) managing dealer contact (e.g. notifying a salesperson that the customer is ready to talk to a salesperson, (iv) no haggle pricing, (v) credit checks, and (vi) finance information. Additionally, the dealer can provide login and password protection for the device 102 and/or app 105, if desired by the dealer. These features that are enabled In at least one embodiment, the functionality is implemented using an iPad application ("app"). In at least one embodiment, the device 102's app 105 has a research section that provides information about a product and/or comparisons with other products. The app 105 can also disclose the actual features of a product to the device 102 user, such as this car has bucket seats, blue-tooth, satellite radio, power windows/locks, v6 engine, etc. Such information is provided by the data server 104, which contains data used by the app 105 and supports functions of the app 105. The dealer can, in at least one embodiment, lock functionality that the dealer does not want to provide to a customer.

In at least one embodiment, the app 105 can treat the user as "logged in" and personalize the experience of the user and save the experience for subsequent times, for example, allow the user to pick up where they left off a week ago, and with local storage this functions like traditional web browser based "cookies." By saving the experience, the user of app 105 can, for example, save the vehicle the user of app 105 is interested in or built and bring the information to the dealership. The app 105 can also include build and price technology to build and price a product.

The app 105 also provides various features such as:
Use Native functionality of the data processing display device (GPS, etc.)
Local storage of files/content (like videos) to avoid download delay over a network
Offline functionality
Press/Brand image for having an app
Selling the app (generating revenue) vs a free website
Using an app 105 on an iPad or iPhone can have some limitations versus a mobile web browser, such as no Adobe flash capability.

Developing the app 105 for an Apple iPad has several properties:
iPad apps are all approved and distributed exclusively by Apple
iPad apps can be free or paid
iPad apps can be developed by anyone
iPad apps are written in a non-web programming language that is mostly unique to Apple (Objective C)
iPad and iPhone apps generally have few differences other than screen size or the presence of a phone/network.
Over 2M iPads sold as of May 31st
Almost 100M iPhone+iPad+iPod Touch "iOS" devices sold to date.

FIGS. 2-11 provide additional information regarding at least one embodiment of a virtual salesperson system and method.

Figure 2:
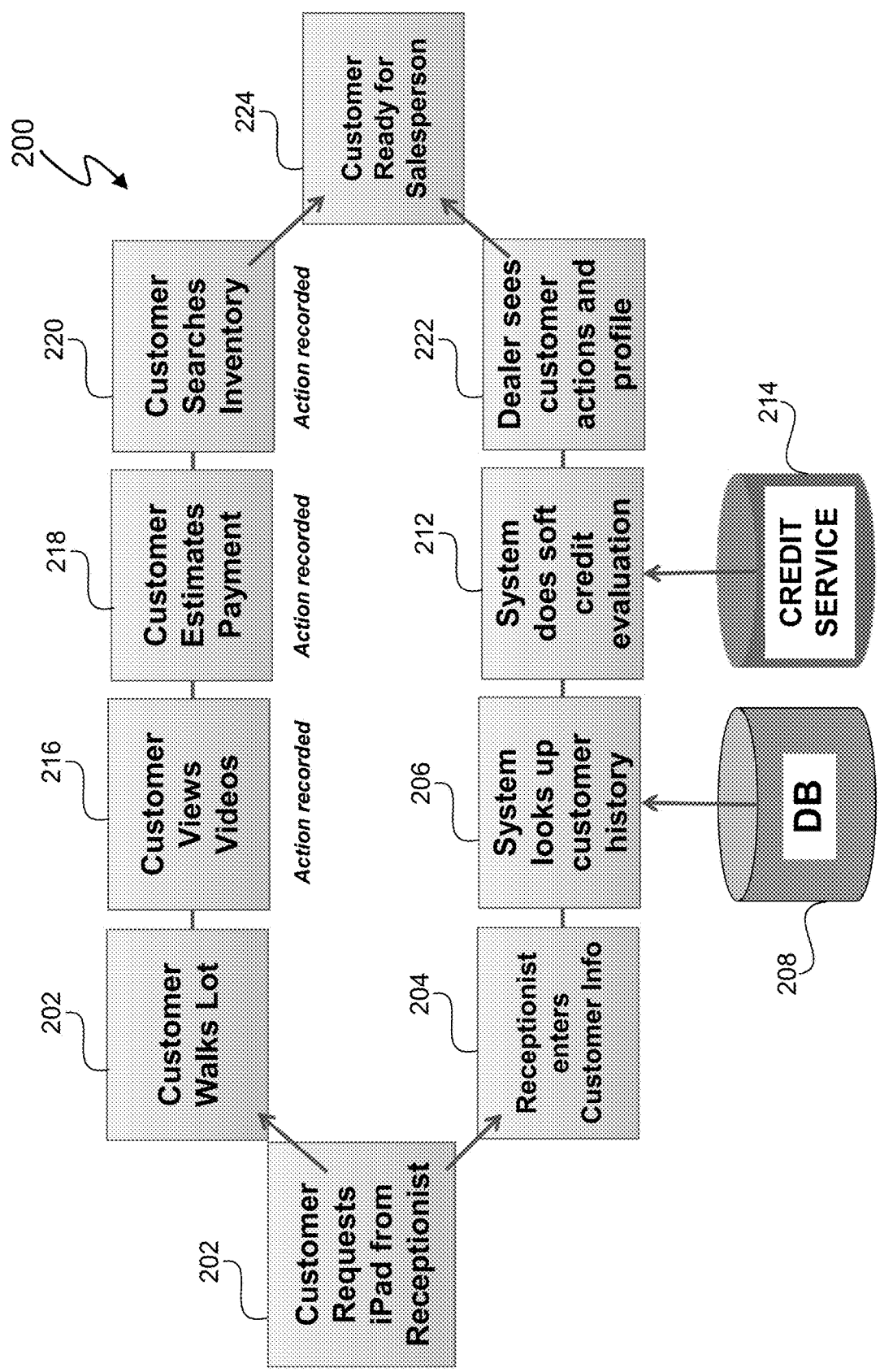
FIG. 2 depicts an exemplary virtual salesperson method flowchart.

FIG. 2 depicts an exemplary virtual salesperson method flowchart 200. In operation 202 a customer at an automobile dealership optionally requests a device 102, such as a tablet computer, from a receptionist at the dealership. The device 102 provides a more scalable model for times of higher customer activity. To obtain the device, in at least one embodiment, the customer provides and, in operation 204, the receptionist enters into data server 104 customer information, such as a Drivers License, mail address and/or phone number, which provides marketing opportunities. In operation 206, the data server 104 accesses database 208 to obtain a customer history. In operation 210, the data server 102 accesses a credit service 214, such as Experian or PayDay Loans, to obtain a credit prescreen of the customer to obtain a credit qualification. The customer can also, for example, qualify for loyalty cash, if available.

In at least one embodiment, the device 102 is equipped with a global positioning system (GPS) locator system to allow a salesperson to locate the customer once the customer is ready to visit with a salesperson. In at least one embodiment, the customer brings his/her own device 102 with an app 105. In at least one embodiment, when the customer arrives at a dealership and runs the APP 105, based on GPS, the app 105 asks/confirms that the customer is physically at the dealership and, if so, unlocks functionality. In at least one embodiment, some functionality of the app 105 unlocks automatically at the dealership based on GPS location or entering a password. The GPS and app 105 can also provide a geocaching game to direct the customer to different vehicles on the lot with, for example, a prize or discount incentive.

The device 102 communicates via a network, such as a phone and/or data network (such as the Internet), to a data server 104. The data server 104 responds to data requests from the device 102 and, in at least one embodiment, contacts a sales office or sales person 106 when the customer is ready to speak with a sales person. Contact can be made in any manner, such as via phone voice or text message or electronic mail. Thus, the device 102 provides information to the user of the device based on the device's location and functionality of the app 105.

The customer can scan a VIN number or enter data to identify the product, such as a vehicle. In at least one embodiment, to identify the vehicle, in at least one other embodiment, the user enters a stock number or takes a picture of the vehicle. The customer can then obtain more information about the product, about similar products, about financing, request a salesperson. The information can be displayed in any form using, for example, text, photos, audio, video, audio and video, or any other type of information dissemination technology. In at least one embodiment, the device 102 then displays a 'personalized' video to the customer. The customer can rank vehicles and identify features the customer "likes".

The information can be sent to the customer while the customer is viewing the vehicle. In at least one embodiment, the device 102 includes an "Unlock Mode" to unlock the doors to any enabled car on the lot so a customer can check out the car without the keys. In at least one embodiment, the device 102 includes "Bring me the keys" functionality to let a customer decide which cars they want the keys for, in order to see or test drive, before talking to a salesperson. The salesperson brings the keys out once the customer is ready.

Additionally, the app 105, in at least one embodiment, can allow a customer to pair the App 105 or a customer's device to the product, such as a car, and allow the customer to play audio (such as a music) through the product's audio system or play video through the product's video system to allow the customer to better evaluate the product. In at least one embodiment, the videos can use sync integration with a vehicle on the lot and play the videos through a vehicle's audio or entertainment system.

In operation 216, the customer can view videos via the app 105. In at least one embodiment, in the videos, a person can become the internet/virtual spokesperson for the product. The virtual spokesperson could conduct the virtual tour videos for every product via the device 102. This provides a new opportunity to show a new direction for the dealer or manufacturer. The videos can also be customized to the dealer. In at least one embodiment, the device 102 can also display accessories listings/up-sells such as potential accessories that can be ordered and added, show an accessorizer/colorizer to see the accessories and corresponding pricing, push DVD as dealer-installed instead of just factory, etc. The device 102, in at least one embodiment, can also show most recent sales (with or without prices) to increase a sense of urgency with the customer.

Additionally, in at least one embodiment, the device 102 can also display a video tour of a vehicle and highlight particular features. In at least one embodiment, the video walks the user though the key features/differentiators of the vehicle and provides pre-recorded talking points for cross-model comparison. The device 102 can become a "mobile kiosk."

In operation 218, the device 102 can provide payment estimates to a customer. Additionally, in at least one embodiment, in operation 218 the app 105 can provide a payment estimator for on-lot vehicles and respond to questions, such as 'how much per month for this one?', 'which ones can I get for under $300/month?', and 'where can I see them?'

In operation 220, the customer searches inventory. The device 102 via app 105 can, for example, display a virtual inventory of the dealership, partner lots, or other venues to the customer. The virtual inventory can also show when a vehicle may arrive or traded. In at least one embodiment, the device 102 can also display employee discount or other special pricing not on a brand site or a window sticker. The device 102 and app 105 also provide build and price functionality. Build and price allows a customer to actually configure another product. Data server 104 can, for example, accept user configuration data to allow a user to configure and price a product. Build and price technology is available from Versata Development Group, Inc. of Austin, TX. In at least one embodiment, the app 105 guides a customer to select 'must haves' vs 'like to haves' and communicates the information to the data server 104 and a sales manager and updates the customer profile. Based on dealer affiliation/preferences, the app 105 can show the best matches to a customer built vehicle in 'friendly' dealers inventory for trade and refutes competing dealers inventory, e.g. "he doesn't have one either, so don't bother going there."

In at least one embodiment, a customer can build one or more vehicles prior to arriving at the dealership. The app 105 guides the customer through the best inventory matches to what the customer previously built, potentially across multiple vehicles in order to see the key features and, in at least one embodiment, even if the dealership is closed or a salesperson is too busy. In at least one embodiment, the app 105 also provides Availability to Promise functionality which provides build and price integration with an ordering system (not shown) to determine how soon a vehicle could be ordered and delivered that corresponds with the customer 'built and priced' vehicle.

The app 105 can also allow a customer to enter and obtain a credit check and finance information through data server 104. The actions of operations 216, 218, and 220 can be recorded and communicated to the data server 104. In operation 222, a user of the data server 104, such as a dealer, can view the customer actions and a customer profile generated from operations 204, 206, and 212.

In operation 224, the customer is ready to visit with a salesperson. In at least one embodiment, the customer pushes a button on the app 105 when ready to talk to a salesperson, which puts the customer in a virtual queue. The salesperson finds the customer using the GPS built into the device 102 and, thus, knows what direction to find the customer in no matter where they are on the lot. The device 102 provides a notification to the customer with a photo and name of the salesperson walking out to meet them. In at least one embodiment, the data server 104 functions as a centralized web portal to "manage the queue" and show customer profiles. Users of the data server 104, such as the Receptionist and sales manager, are able to see who has the devices 102 based on the driver's license info provided to the receptionist, for example:

iPad #1: Mike Jones, arrived 44 minutes ago
iPad #2: available
iPad #3: . . .

Or, if it's a customer-owned device, a more detailed but more anonymous profile would be shown, such as Customer iPad: Flex Buyer, $3^{rd}$ visit, researching for 45 days, identified preferred VIN before arriving.

Via a web portal provided by the data server 104, in at least one embodiment, a user, such as a sales manager, can view specific information about a customer, such as:

Customer: Mike Jones (iPad #1)
First visit in last 90 days
Last Purchase: 35 months ago—2008 F-150 from this dealership
$7500 left in lease payments through November 2011, blue book no more than $6000, so possibly underwater
Customer viewed Sync and Sirius Videos
Last Estimated payment at $330 month
Searched Inventory until Blue Lariats with 4×4 were displayed and got no matches. Trade partners do have matching inventory.
High probability of qualifying for credit
Estimated Payment assumed $3k down, no-trade in.

FIGS. 3-9 depict an exemplary virtual salesperson process and user interfaces of an application of the virtual sales person system of FIG. 1 where the product field is automobiles at an automotive dealership.

Figure 3:
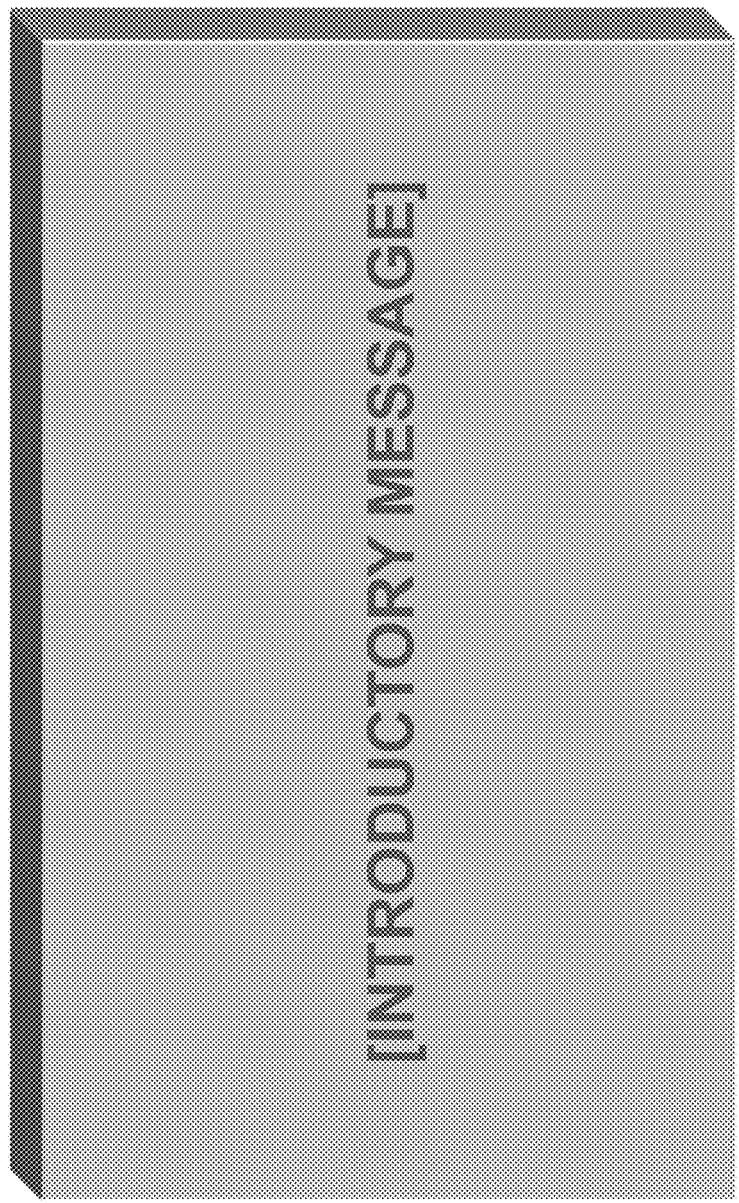
FIGS. 3-9 depict an exemplary virtual salesperson process and user interfaces of an application of the virtual sales person system of FIG. 1 where the product field is automobiles at an automotive dealership.
Figure 4:
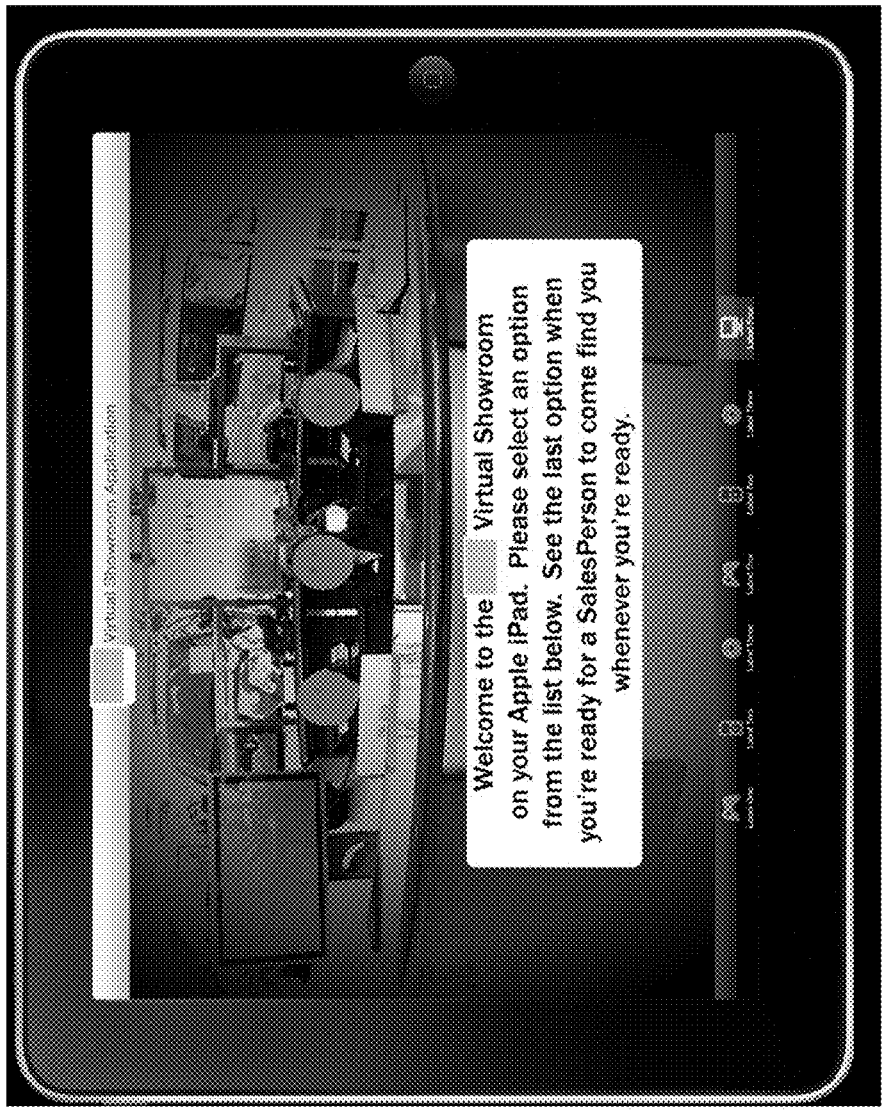

FIG. 3 depicts an exemplary introductory screen of the app 105, and the "introductory message" is a matter of design choice. FIG. 4 depicts an exemplary main menu user interface (UI) 400 of app 105. The main menu user interface 400 provides a virtual welcome to a user of the app 105 and provides buttons 402 for activating functional options. The main menu UI 400 includes buttons 402 for each major function of the app 105, e.g. Research, Build, Search/ Inventory, Estimate Payment, Owner, SalesPerson.

Figure 5:
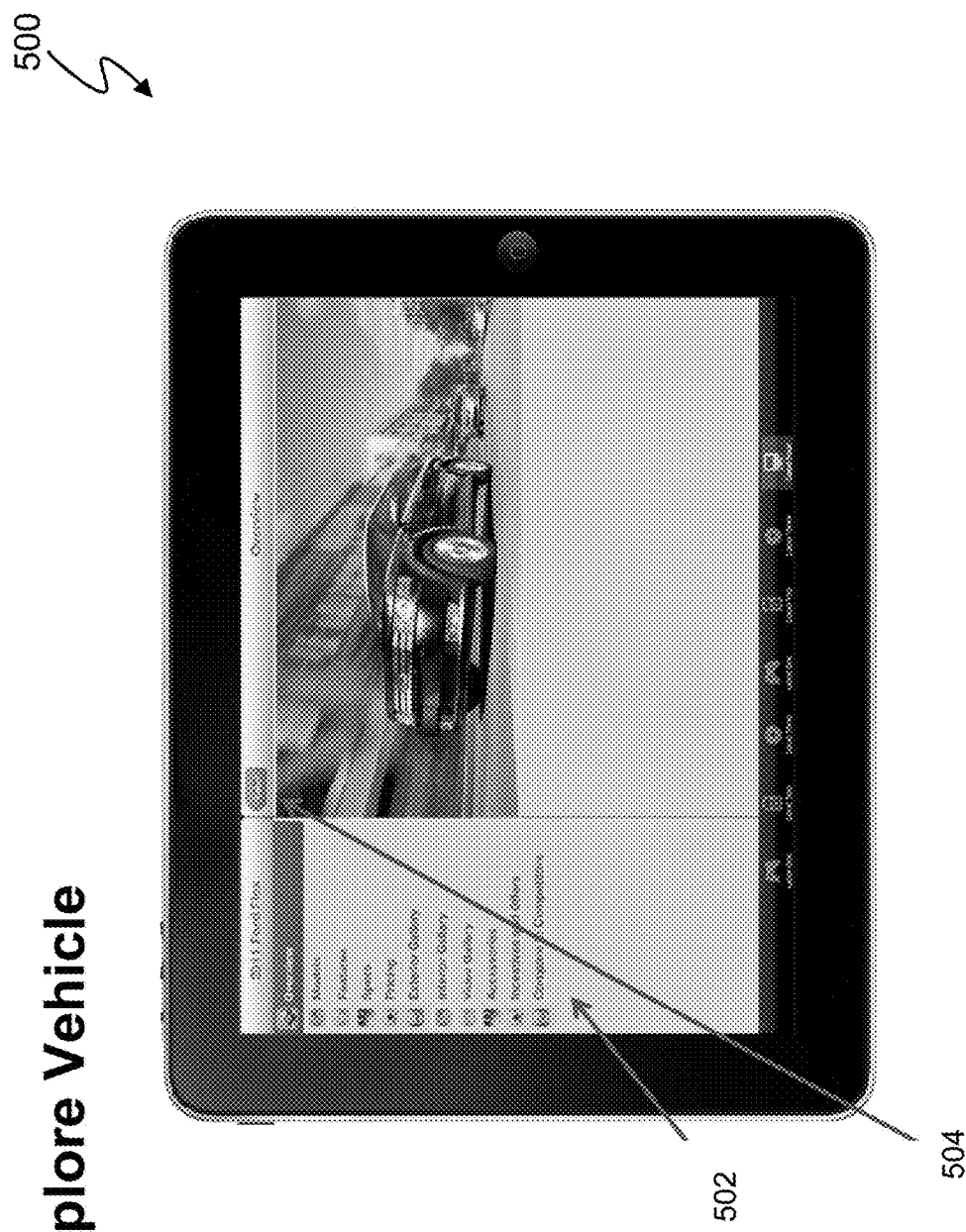

FIG. 5 depicts an explore vehicle UI 500, which provides a portal for brand site content and video walkthrough tours. The explore vehicle UI 500 provides the exemplary functions 503 of: vehicle overview, models, features, specifications (specs), pricing, exterior gallery, interior gallery, video gallery, accessories, incentives and offers, comparison with other vehicles such as competitor vehicles or other vehicles selected by the customer/user. The explore vehicle UI 500 also includes a link back button to explore a different vehicle.

Figure 6:
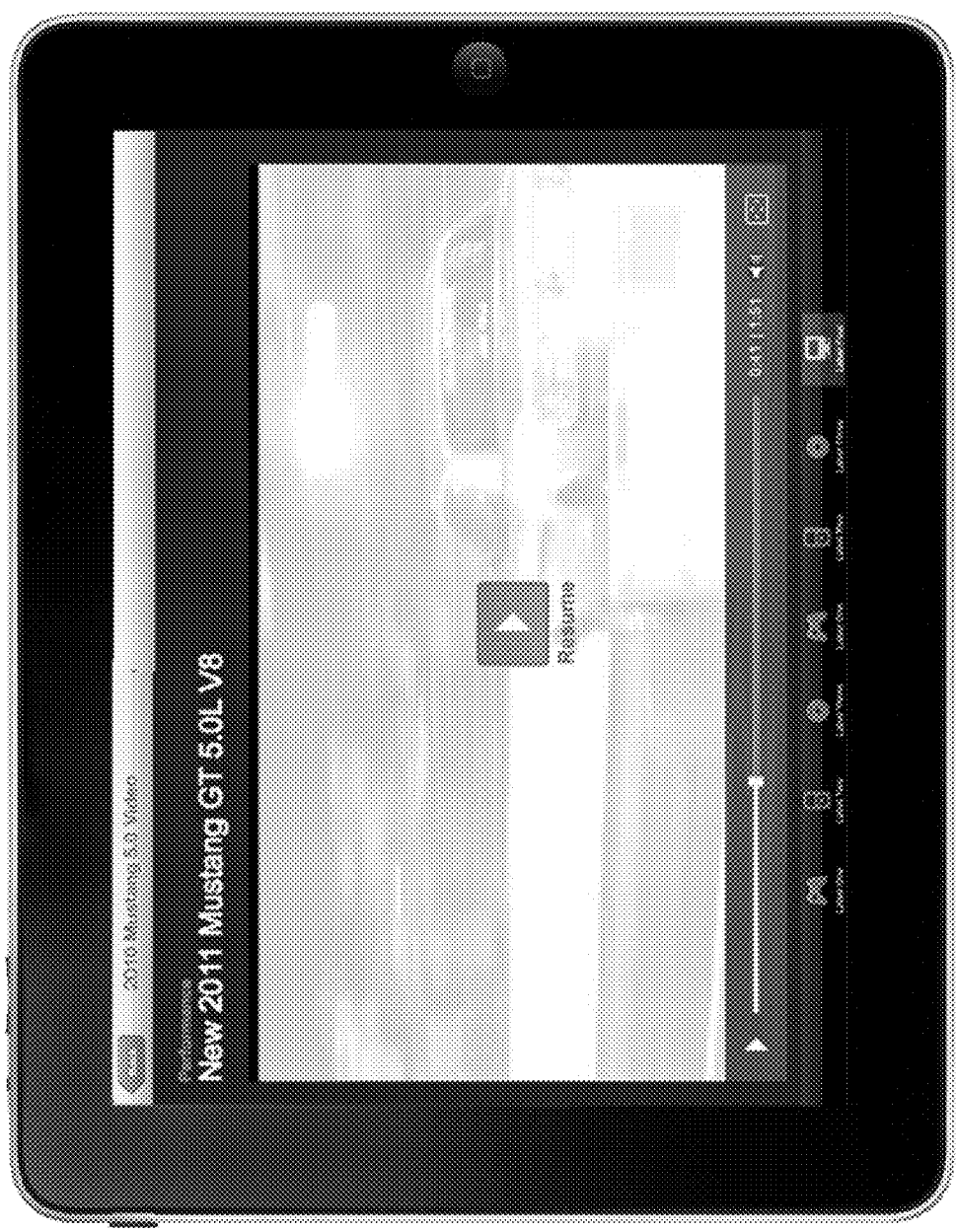

FIG. 6 depicts an exemplary video display 600 for app 105 of a vehicle as previously described. In at least one embodiment, the video display 600 includes a virtual salesperson giving a tour of a selected vehicle. In at least one embodiment, the videos are saved locally at the device 102 and play instantly and glitch-free.

Figure 7:
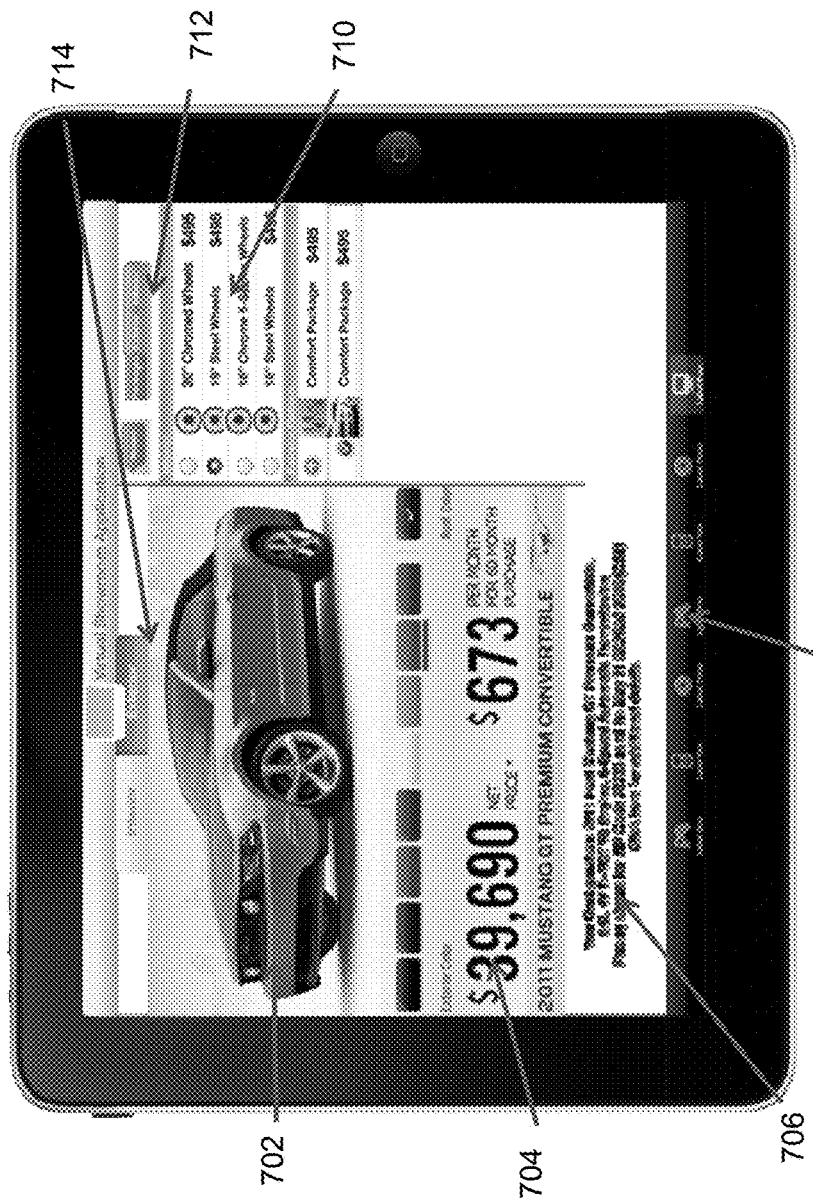

FIG. 7 depicts an exemplary build and price UI 700. The build and price UI 700 allows a user of device 102 to build and price a vehicle. The UI 700 includes a colorized image 702, pricing information 704, standard disclaimers 706, a button 708 for full payment estimation, a part selector 710 for configuration, various build aspects tabs 712, such as packages, exterior, and interior tabs, and a canvass selection button 714 for interior and exterior canvasses.

Figure 8:
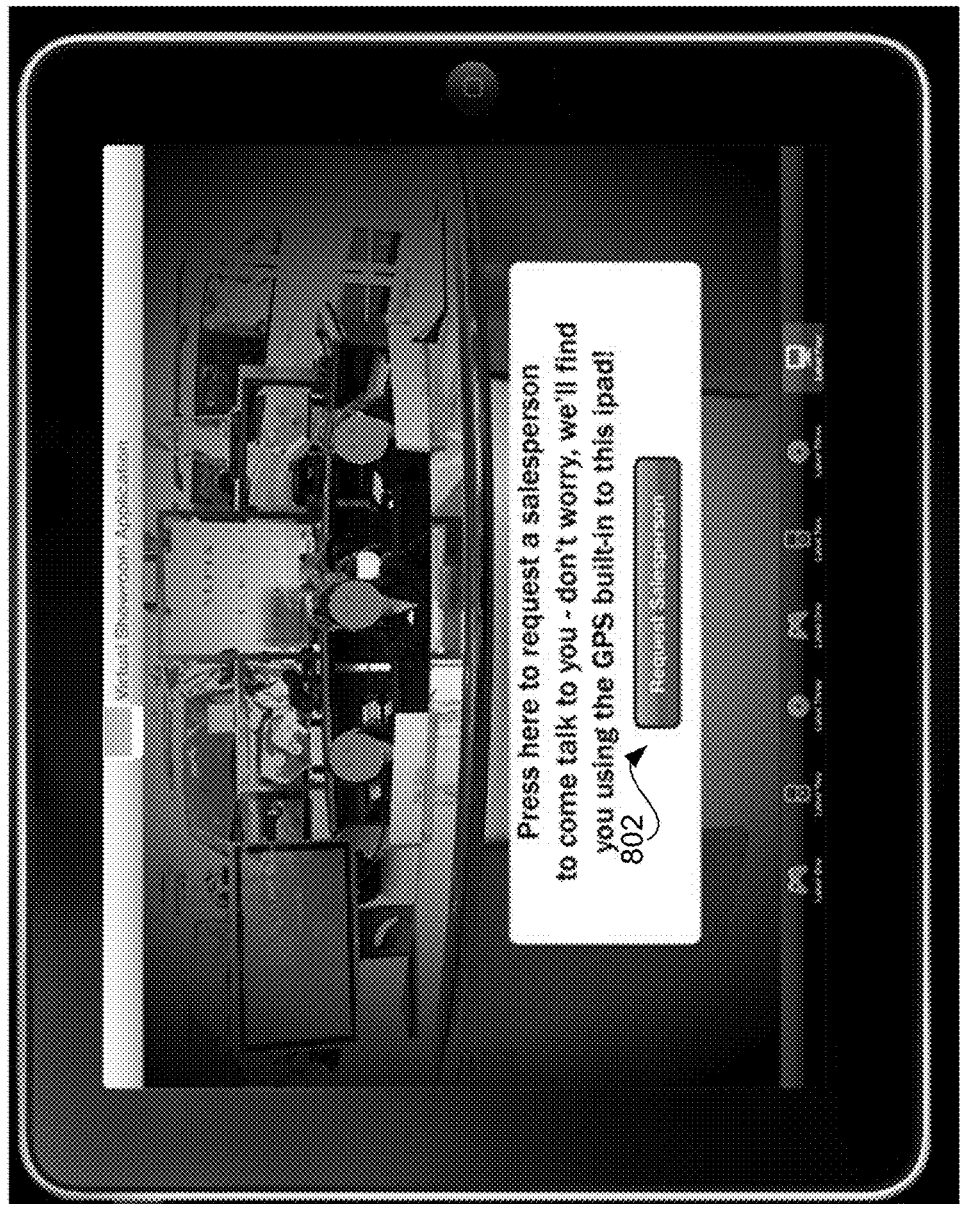

FIG. 8 depicts a request a salesperson UI 800. By selecting the "Request Salesperson" button 802, the app 105 transmits data to contact a salesperson as previously described. In at least one embodiment, the GPS feature of the device 102 allows the salesperson to locate the customer using the device 102.

Figure 9:
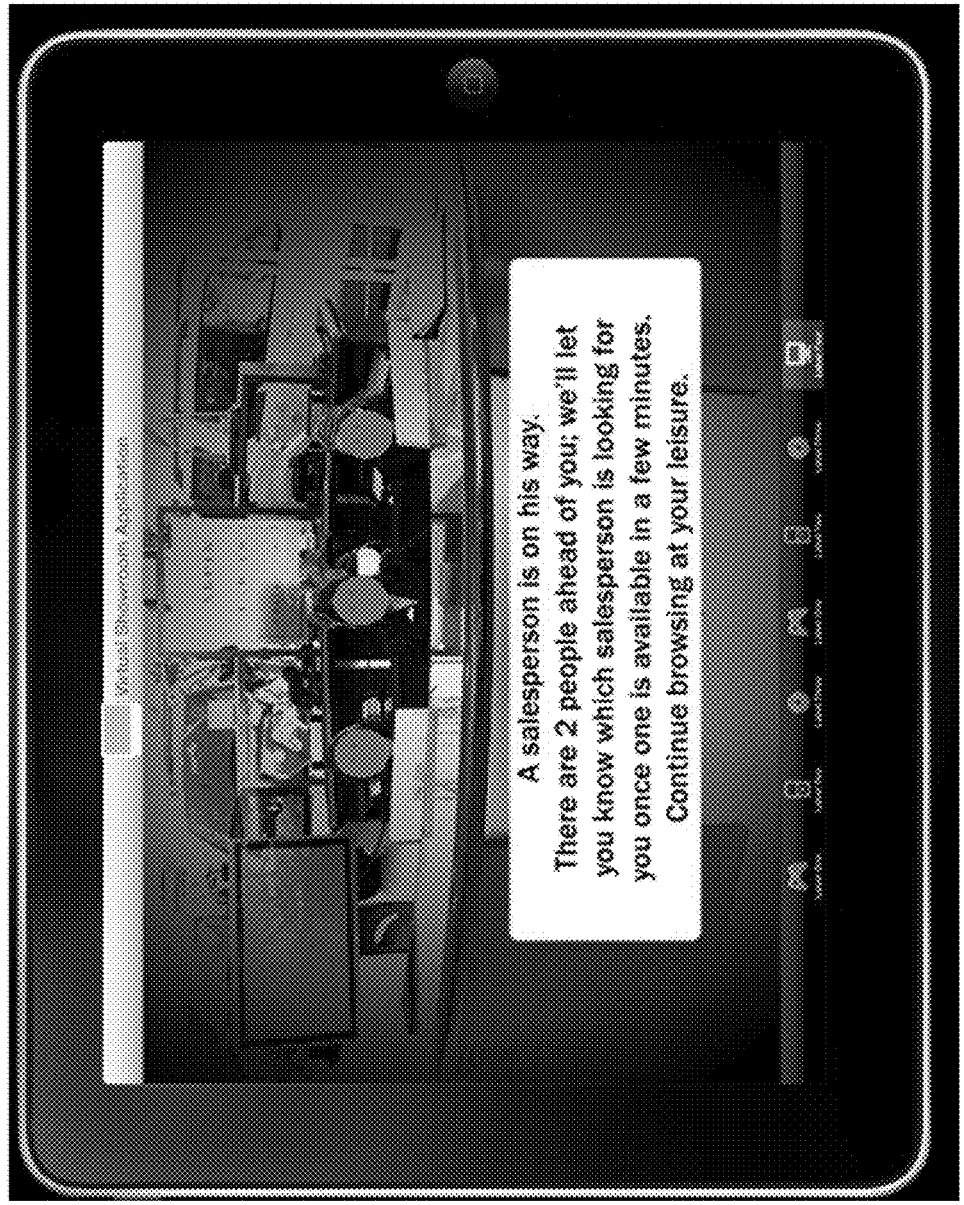

FIG. 9 depicts a UI 900 that notifies the customer that a salesperson has been requested and will locate the customer shortly.

Figure 10:
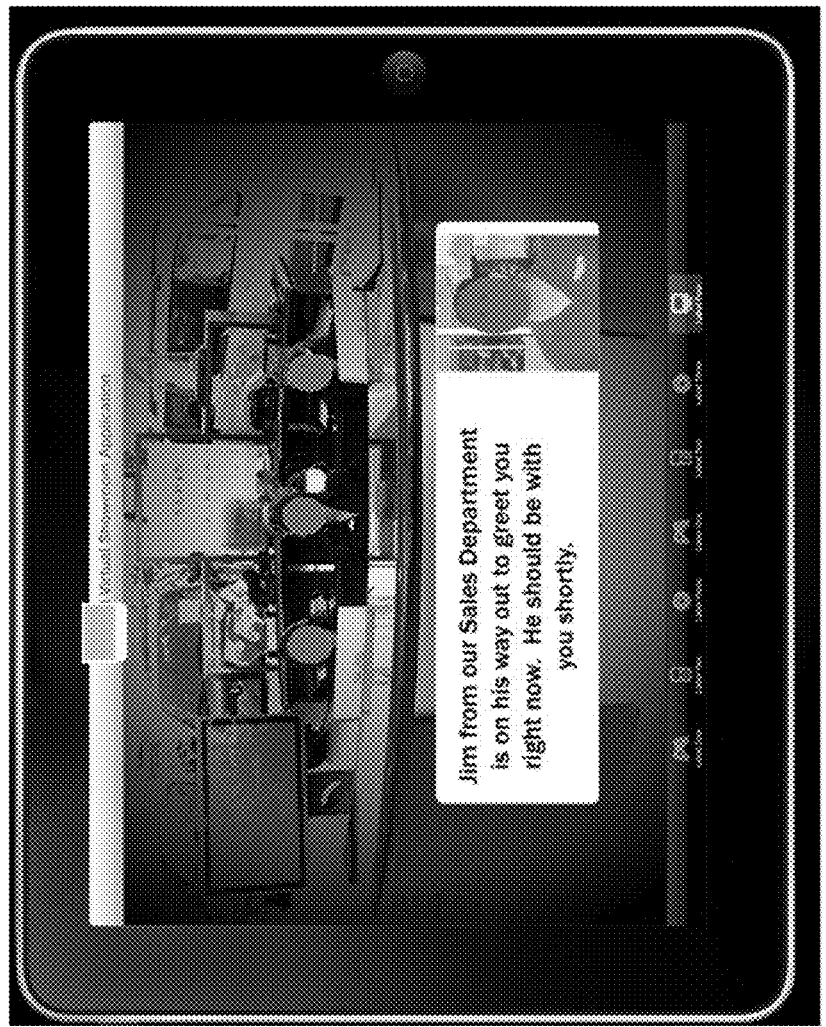
FIG. 10 depicts embodiments of an application for multiple sales engagements.

FIG. 10 depicts a UI 1000 that notifies the customer that a salesperson is on the way.

Figure 11:
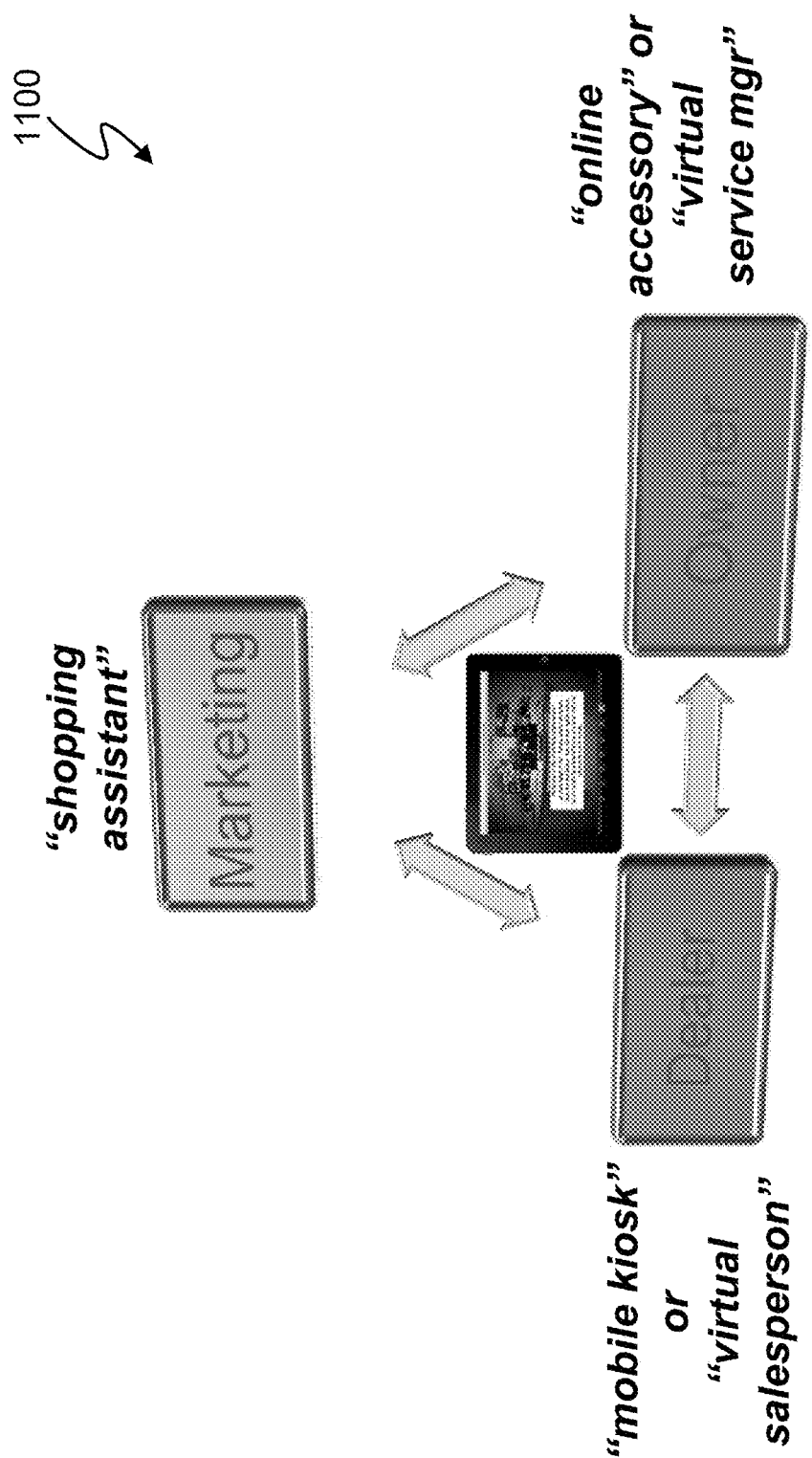
FIG. 11 depicts exemplary applications of the app 105.

FIG. 11 depicts exemplary applications of the app 105. For example, the app 105 can be used as a "shopping assistant" for marketing, a "mobile kiosk" or "virtual salesperson" for a dealer, and an "online accessory" or "virtual service manager" for an owner.

FIG. 10 depicts embodiments of an application for multiple sales engagements. The application 105 (FIG. 1) is useful to cover multiple customer engagement types such as customer engagements:

Marketing—before visiting a dealer
Sales—On site at the dealership
Post-Sale—Owner/Service Although the present invention has been described in detail, it should be understood that various changes, substitutions and alterations can be made hereto without departing from the spirit and scope of the invention as defined by the appended claims.

What is claimed is:

1. A portable computer having video tracking, the portable computer comprising:
    means for enabling functionality in the portable computer that links the portable computer to a remote data processing system;
    means for enabling functionality in the portable computer to access data in a database of the remote processing system and transmit the data to the portable computer to display a tour of items in a physical facility and highlight specific features of one or more of the items and provide content associated with one or more of the items;
    means for determining a position of the portable computer based on position data transmitted by the portable computer;
    means for determining based on the position data transmitted by the portable computer that the portable computer is in a location where functionality of the portable computer can be unlocked;
    means for unlocking functionality based on the position data transmitted by the portable computer to allow the portable computer to display videos in the determined location where the functionality can be unlocked;
    means for displaying the videos of items in the facility;
    means for tracking which videos were displayed by the portable computer;
    means for determining from at least tracking the videos which items a user of the portable computer is interested in;
    means for tracking data communication with the portable computer;
    means for establishing a communication channel with the computer system to provide data related to the tracked data communication to the computer system.

2. The portable computer of claim 1 further comprising:
    means for allowing a user of the portable computer to search inventory of one or more dealers associated with a showroom.

3. The portable computer of claim 1 further comprising:
    means for configuring a product, price a product, and obtain a payment estimate of the product.

4. The portable computer of claim 1 wherein the position data transmitted by the portable computer is global positioning system (GPS) data.

5. The portable computer of claim 4 further comprising:
    means for unlocking the functionality to allow the portable computer to:
        search product inventory located at a facility; and
        notify a salesperson at the facility that the user of the portable computer is ready to talk to the salesperson.

6. The portable computer of claim 3 further comprising:
    means for tracking data communication with the portable computer including one or more payment estimation data; and
    means for receiving an initial offer aligned with the products determined to be of interest to the user based on the tracked videos displayed by the portable computer and by the tracked data communication with the portable computer.

7. The portable computer of claim 1 wherein the items are products.

8. A data processing system comprising:
    a receiver to receive communications of data from a portable computer, wherein:
        the data relates to tracked data communications between the receiver and the portable computer; and
        the portable computer includes a processor and a memory coupled to the processor, wherein the processor includes code executable by the processor to perform operations comprising:
            enabling functionality in the portable computer that links the portable computer to a remote data processing system;
            enabling functionality in the portable computer to access data in a database of the remote processing system and transmit the data to the portable computer to display a tour of items in a physical facility and highlight specific features of one or more of the items and provide content associated with one or more of the items;

determining a position of the portable computer based on position data transmitted by the portable computer;

determining based on the position data transmitted by the portable computer that the portable computer is in a location where functionality of the portable computer can be unlocked;

unlocking functionality based on the position data transmitted by the portable computer to allow the portable computer to display videos in the determined location where the functionality can be unlocked;

displaying the videos of items in the facility;

tracking which videos were displayed by the portable computer;

determining from at least tracking the videos which items a user of the portable computer is interested in;

tracking data communication with the portable computer;

establishing a communication channel with the receiver to provide the data related to the tracked data communication to the receiver.

9. The method of claim 8 wherein the code is further executable by the processor to perform operations comprising:

allowing a user of the portable computer to search inventory of one or more dealers associated with a showroom.

10. The method of claim 8 wherein the code is further executable by the processor to perform operations comprising:

configuring a product, price a product, and obtain a payment estimate of the product.

11. The method of claim 8 wherein the position data transmitted by the portable computer is global positioning system (GPS) data.

12. The method of claim 11 wherein the code is further executable by the processor to perform operations comprising:

when the portable computer is determined to be in the location where the functionality can be unlocked:

unlocking the functionality to allow the portable computer to:

search product inventory located at the facility; and notify a salesperson at the facility that the user of the portable computer is ready to talk to the salesperson.

* * * * *